US012591536B2

(12) United States Patent
Jin et al.

(10) Patent No.: US 12,591,536 B2
(45) Date of Patent: Mar. 31, 2026

(54) USER MODE DIRECT DATA ACCESS TO NON-VOLATILE MEMORY EXPRESS DEVICE VIA KERNEL-MANAGED QUEUE PAIR

(71) Applicant: Microsoft Technology Licensing, LLC, Redmond, WA (US)

(72) Inventors: Ming Jin, Shanghai (CN); Vadim Makhervaks, Bellevue, WA (US); Ji Dai, Shanghai (CN); Tengda Yan, Shanghai (CN); Yuan Yi, Shanghai (CN); Chuanjun Yin, Shanghai (CN); Scott Chao-Chueh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 18/592,046

(22) Filed: Feb. 29, 2024

(65) Prior Publication Data

US 2025/0156360 A1     May 15, 2025

Related U.S. Application Data

(60) Provisional application No. 63/598,429, filed on Nov. 13, 2023.

(51) Int. Cl.
*G06F 13/40*      (2006.01)
*G06F 13/16*      (2006.01)

(52) U.S. Cl.
CPC ...... *G06F 13/4072* (2013.01); *G06F 13/1642* (2013.01); *G06F 13/1673* (2013.01); *G06F 2213/1602* (2013.01)

(58) Field of Classification Search
CPC .. G06F 13/1642; G06F 13/1673; G06F 13/28; G06F 13/4072; G06F 2213/1602
See application file for complete search history.

(56) References Cited

U.S. PATENT DOCUMENTS

| | | | |
|---|---|---|---|
| 10,831,684 B1 * | 11/2020 | Kamran | ............... G06F 3/0689 |
| 11,086,524 B1 | 8/2021 | Sun | |
| 11,886,427 B1 | 1/2024 | Shveidel | |
| 12,117,938 B1 | 10/2024 | Derzhavetz | |

(Continued)

OTHER PUBLICATIONS

Gugnani, et al., "Arcadia: A Fast and Reliable Persistent Memory Replicated Log", arXiv:2206.12495v1, Jun. 24, 2022, pp. 1-14.

(Continued)

*Primary Examiner* — Phong H Dang
(74) *Attorney, Agent, or Firm* — Workman Nydegger

(57) ABSTRACT

Systems and methods are disclosed for implementing a Non-Volatile Memory Express (NVMe) driver in a computer system. The method involves mapping a memory buffer into a user mode address space to facilitate data transfer with an NVMe device via direct memory access (DMA). Additionally, a first NVMe queue pair, including a submission queue (SQ) and a completion queue (CQ), is mapped into the user mode address space, allowing a user mode component to submit commands to the NVMe device. The method further enables the user mode component to ring a doorbell at the NVMe device. Finally, an NVMe command is processed in kernel mode using a second NVMe queue pair comprising a second SQ and a second CQ.

20 Claims, 5 Drawing Sheets

400

(56) References Cited

U.S. PATENT DOCUMENTS

| | | | | |
|---|---|---|---|---|
| 12,182,421 | B1 | 12/2024 | Vankamamidi | |
| 12,204,457 | B1 | 1/2025 | Vankamamidi | |
| 12,271,625 | B1 | 4/2025 | Astolfi | |
| 2009/0138625 | A1* | 5/2009 | Lee | G06F 13/28 |
| | | | | 719/321 |
| 2012/0054381 | A1 | 3/2012 | Craddock et al. | |
| 2012/0124294 | A1 | 5/2012 | Atkisson et al. | |
| 2012/0278511 | A1 | 11/2012 | Alatorre | |
| 2016/0092118 | A1 | 3/2016 | Kumar | |
| 2016/0306580 | A1* | 10/2016 | Pinto | G06F 13/4282 |
| 2017/0052723 | A1 | 2/2017 | Voigt | |
| 2017/0308298 | A1* | 10/2017 | Vyshetsky | G06F 3/0688 |
| 2018/0150397 | A1 | 5/2018 | Gupta | |
| 2018/0316760 | A1 | 11/2018 | Chernin | |
| 2019/0317906 | A1 | 10/2019 | Adavi | |
| 2020/0034475 | A1 | 1/2020 | Venkatesan | |
| 2020/0097419 | A1 | 3/2020 | Xing | |
| 2020/0379925 | A1* | 12/2020 | Andrus | G06F 9/546 |
| 2020/0409583 | A1 | 12/2020 | Kusters | |
| 2021/0117333 | A1 | 4/2021 | Qureshi | |
| 2021/0216459 | A1 | 7/2021 | Benhanokh | |
| 2022/0019362 | A1 | 1/2022 | Badiger | |
| 2023/0013913 | A1* | 1/2023 | Zinger | G06F 9/4881 |
| 2023/0195751 | A1 | 6/2023 | Sun | |
| 2023/0333777 | A1 | 10/2023 | Shveidel | |
| 2023/0342087 | A1* | 10/2023 | He | G06F 13/1668 |
| 2024/0106754 | A1 | 3/2024 | Meng | |
| 2024/0232020 | A1 | 7/2024 | Shveidel | |
| 2024/0256190 | A1 | 8/2024 | Shveidel | |
| 2025/0103490 | A1 | 3/2025 | Seibel | |
| 2025/0156104 | A1 | 5/2025 | Wang | |
| 2025/0156322 | A1 | 5/2025 | Tong | |
| 2025/0156333 | A1 | 5/2025 | Wang | |
| 2025/0156353 | A1 | 5/2025 | Jin | |
| 2025/0159043 | A1 | 5/2025 | Tong | |

OTHER PUBLICATIONS

International Search Report and Written Opinion received for PCT Application No. PCT/US2024/051682, Feb. 11, 2025, 14 pages.
International Search Report and Written Opinion received for PCT Application No. PCT/US2024/052172, Jan. 29, 2025, 14 Pages.
Lee, et al., "X-SSD: A Storage System with Native Support for Database Logging and Replication", IEEE, Computer Society Press, Jun. 12, 2022, pp. 988-1002.
Ruan, et al., "Persistent Memory Disaggregation for Cloud-Native Relational Databases", International conference on Automotive User Interfaces and Interactive Vehicular Applications, Mar. 25, 2023, pp. 498-512.
Yang, et al., "Orion: A Distributed File System for Non-Volatile Main Memories and RDMA-Capable Networks", Feb. 26, 2019, pp. 221-234.
Non-Final Office Action mailed on Jun. 30, 2025, in U.S. Appl. No. 18/592,026, 15 pages.
Notice of Allowance mailed on Jun. 18, 2025, in U.S. Appl. No. 18/595,061, 08 pages.
Notice of Allowance mailed on Jun. 23, 2025, in U.S. Appl. No. 18/594,982, 10 pages.
"Notification Port Example", Retrieved From: https://learn.microsoft.com/en-us/previous-versions/windows/desktop/mscs/notification-port-example, May 31, 2018, 4 Pages.
"Receiving Cluster Events", Retrieved From: https://learn.microsoft.com/en-us/previous-versions/windows/desktop/mscs/receiving-cluster-events, May 31, 2018, 1 Page.
Notice of Allowance mailed on Apr. 8, 2025, in U.S. Appl. No. 18/594,982, 09 pages.
Notice of Allowance mailed on Mar. 26, 2025, in U.S. Appl. No. 18/595,061, 09 pages.
U.S. Appl. No. 63/598,420, filed Nov. 13, 2023.
U.S. Appl. No. 63/598,426, filed Nov. 13, 2023.
U.S. Appl. No. 63/598,429, filed Nov. 13, 2023.
U.S. Appl. No. 63/598,438, filed Nov. 13, 2023.
U.S. Appl. No. 18/594,982, filed Mar. 4, 2024.
U.S. Appl. No. 18/595,061, filed Mar. 4, 2024.
U.S. Appl. No. 18/587,247, filed Feb. 26, 2024.
U.S. Appl. No. 18/587,258, filed Feb. 26, 2024.
U.S. Appl. No. 18/592,026, filed Feb. 29, 2024.
Non-Final Office Action mailed on Aug. 27, 2025, in U.S. Appl. No. 18/587,247, 12 pages.
Notice of Allowability mailed on Sep. 2, 2025, in U.S. Appl. No. 18/595,061, 05 pages.
Notice of Allowance mailed on Aug. 12, 2025, in U.S. Appl. No. 18/594,982, 10 pages.
Notice of Allowance mailed on Aug. 22, 2025, in U.S. Appl. No. 18/595,061, 08 pages.
Notice of Allowance mailed on Sep. 16, 2025, in U.S. Appl. No. 18/594,982, 10 pages.
Notice of Allowance mailed on Sep. 30, 2025, in U.S. Appl. No. 18/592,026, 7 Pages.
Final Office Action mailed on Feb. 4, 2026, in U.S. Appl. No. 18/587,247, 13 pages.

* cited by examiner

USER MODE DIRECT DATA ACCESS TO NON-VOLATILE MEMORY EXPRESS DEVICE VIA KERNEL-MANAGED QUEUE PAIR

CROSS-REFERENCE TO RELATED APPLICATIONS

This application claims priority to, and the benefit of, U.S. Provisional Application Ser. No. 63/598,429, filed Nov. 13, 2023, and entitled "USER SPACE DIRECT DATA ACCESS TO NON-VOLATILE MEMORY EXPRESS DEVICE VIA KERNEL-MANAGED QUEUE PAIR," the entire contents of which are incorporated by reference herein in their entirety.

BACKGROUND

Cloud computing has revolutionized the way data is stored and accessed, providing scalable, flexible, and cost-effective solutions for businesses and individuals alike. A core component of these systems is the concept of virtualization, which allows for the creation of virtual machines (VMs) or containers that can utilize resources abstracted from the physical hardware. VMs and containers utilize storage resources, typically in the form of virtual disks. Oftentimes, virtual disks are not tied to any specific physical storage device, but rather, they are abstracted representations of storage space that can be dynamically allocated and adjusted based on the requirements of each VM or container. This abstraction allows for greater flexibility and scalability, as storage resources can be allocated and adjusted dynamically based on the requirements of the VM or container.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, including, at a Non-Volatile Memory Express (NVMe) driver operating in a kernel mode: mapping a memory buffer into a user mode address space, the memory buffer enabling data transfer with an NVMe device via direct memory access (DMA); mapping a first NVMe queue pair, which includes a first submission queue (SQ) and a first completion queue (CQ), into the user mode address space, the first NVMe queue pair enabling a user mode component to submit a command to the NVMe device; enabling the user mode component to ring a doorbell at the NVMe device; and processing an NVMe command in the kernel mode using a second NVMe queue pair, which includes a second SQ and a second CQ.

In some aspects, the techniques described herein relate to methods, systems, and computer program products, including, by a user mode component: identifying a mapping of an NVMe queue pair, which includes an SQ and a CQ, into a user mode address space, the NVMe queue pair having been mapped into the user mode address space by a kernel mode NVMe driver; submitting an NVMe command to an NVMe device, including, writing an SQ entry to the SQ of the NVMe queue pair, and ringing an SQ doorbell register; and polling the CQ of the NVMe queue pair and, based on the polling, identifying a CQ entry.

In some aspects, the techniques described herein relate to methods, systems, and computer program products, including, within a kernel mode context in a computer system: mapping a memory buffer into a user mode address space, the memory buffer enabling data transfer with an NVMe device via DMA; mapping a first NVMe queue pair, which includes a first SQ and a first CQ, into the user mode address space, the first NVMe queue pair enabling a user mode component to submit a command to the NVMe device; enabling the user mode component to ring a doorbell at the NVMe device; and processing an NVMe command using a second NVMe queue pair, which includes a second SQ and a second CQ; and, within a user mode context in the computer system: identifying the first NVMe queue pair; submitting the NVMe command to the NVMe device, including, writing an SQ entry to the first SQ and ringing an SQ doorbell register; and polling the first CQ, and, based on the polling, identify a CQ entry.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which.

DETAILED DESCRIPTION

Figure 1:
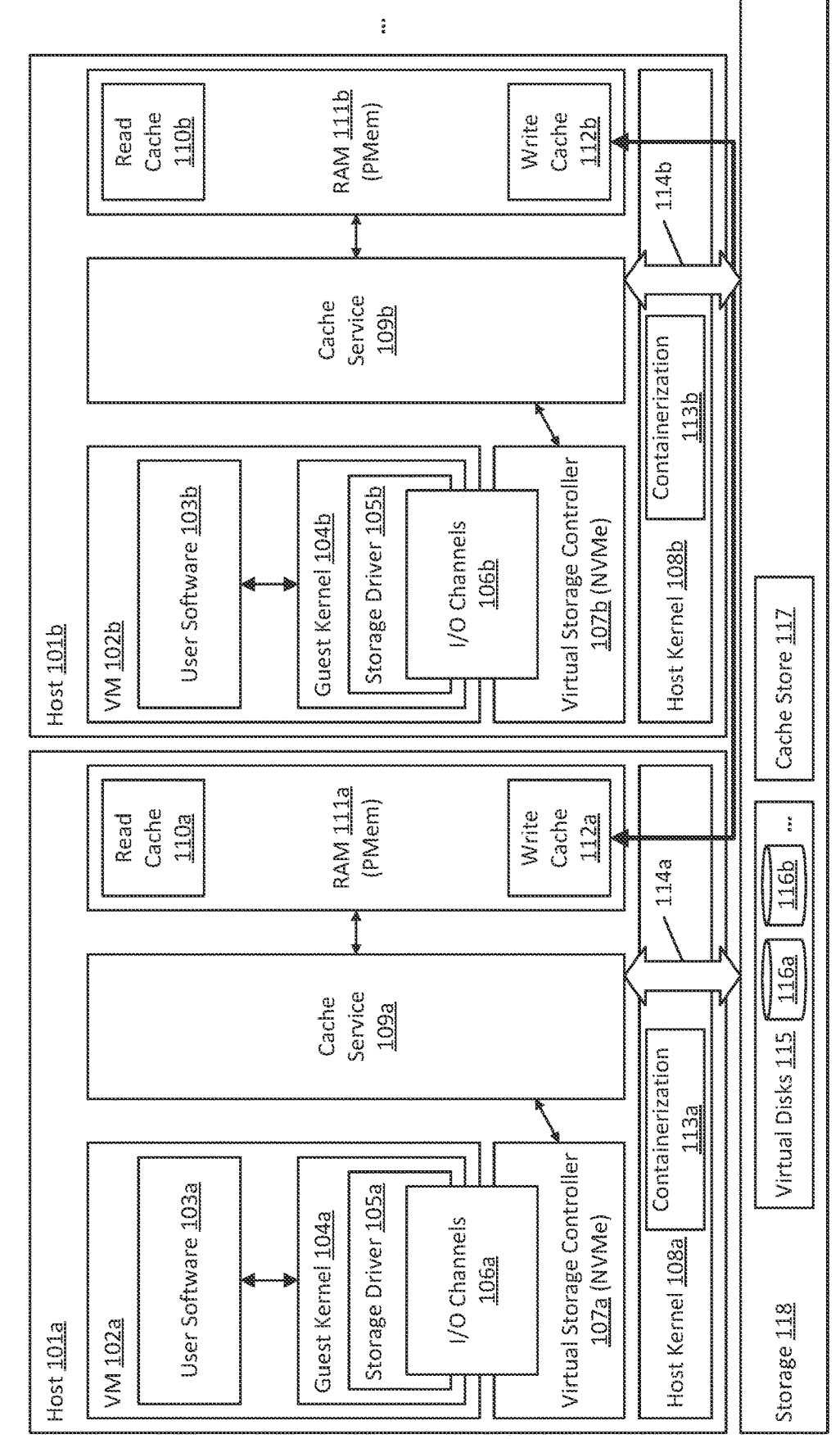
FIG. 1 illustrates an example of a computer architecture that includes a host cache service operating within a cloud environment.

The performance of cloud environments is closely tied to the performance of storage Input/Output (I/O) operations within those environments. For example, the performance of a virtual machine (VM) or container can be impacted greatly by the performance of storage I/O operations used by the VM or container to access (e.g., read from or write to) a virtual disk. Some embodiments described herein are operable within the context of a host cache (e.g., a cache service operating at a VM/container host) that improves the performance of I/O operations of a hosted VM or container for accessing a virtual disk.

In some embodiments, a host cache utilizes persistent memory (PMem) and Non-Volatile Memory Express (NVMe) technologies to improve storage I/O performance within a cloud environment. PMem refers to non-volatile memory technologies (e.g., INTEL OPTANE, SAMSUNG Z-NAND) that retain stored contents through power cycles. This contrasts with conventional volatile memory technologies such as dynamic random-access memory (DRAM) that lose stored contents through power cycles. Some PMem technology is available as non-volatile media that fits in a computer's standard memory slot (e.g., Dual Inline Memory Module, or DIMM, memory slot) and is thus addressable as random-access memory (RAM).

NVMe refers to a type of non-volatile block storage technology that uses the Peripheral Component Interconnect Express (PCIe) bus and is designed to leverage the capabilities of high-speed storage devices like solid-state drives (SSDs), providing faster data transfer rates compared to traditional storage interfaces (e.g., Serial AT Attachment (SATA)). NVMe devices are particularly beneficial in data-intensive applications due to their low latency I/O and high I/O throughput compared to SATA devices. NVMe devices can also support multiple I/O queues, which further enhance their performance capabilities.

Currently, PMem devices have slower I/O access times than DRAM, but they provide higher I/O throughput than SSD and NVMe. Compared to DRAM, PMem modules come in much larger capacities and are less expensive per gigabyte (GB), but they are more expensive per GB than NVMe. Thus, PMem is often positioned as lower-capacity "top-tier" high-performance non-volatile storage that can be backed in a "lower-tier" by larger-capacity NVMe drives, SSDs, and the like. As a result, PMem is sometimes referred to as "storage-class memory."

The NVMe specification defines an interface between a host computer (e.g., an NVMe driver executing at the host computer) and an NVMe controller. This interface is based on the use of queue pairs, each comprising a submission queue (SQ) and a completion queue (CQ), that are shared between an NVMe driver and an NVMe controller. SQs and CQs are ring buffers with fixed slot sizes that are allocated from host memory accessible to the NVMe controller (e.g., via direct memory access (DMA)). The first entry of each queue is indicated by a head value, and the last entry of each queue is indicated by a tail value. Multiple SQs can utilize a single CQ, though there can be multiple CQ's available. One SQ/CQ pairing is used as an administrative queue (e.g., for non-I/O operations such as to set up SQs and CQs), while additional SQ/CQ pairings are used as data queues (e.g., on I/O data paths).

To issue commands to an NVMe controller, an NVMe driver places one or more SQ entries (e.g., each specifying a command) into an SQ. The NVMe driver then signals the NVMe controller about the presence of those entries by writing a value to a "doorbell" register, at the NVMe controller, that is associated with that SQ. Writing a value to an SQ doorbell register is often referred to as "ringing" an SQ doorbell. The value written indicates a new tail slot (e.g., last entry) of the SQ, for example, based on a number of SQ entries that were placed by the NVMe driver onto the SQ. Based on the value written to the doorbell register, the NVMe controller reads one or more SQ entries from the SQ and completes each corresponding command indicated by the SQ entries (e.g., in the order received, in a priority order).

When the NVMe controller completes a given command, it inserts a corresponding CQ entry into a CQ that is paired with the SQ through which the command was submitted. The NVMe driver then obtains a given command's completion state from a CQ entry on the CQ and uses that completion state to complete the command (e.g., return success, return failure). When the NVMe driver has finished processing a given CQ entry, it writes to the CQ's doorbell register, signaling to the NVMe controller that this CQ slot can be re-used for future completions.

NVMe devices are conventionally interacted with fully in kernel mode by a kernel mode NVMe driver or fully in user mode using a user mode NVMe driver—for example, using technologies such as Storage Performance Development Kit (SPDK). In contrast, at least some embodiments herein provide user mode direct access to NVMe device I/O-path queue pairs (e.g., SQs and CQs) that are managed by an operating system (OS) kernel. Thus, the embodiments described herein provide for secure kernel mode management of an NVMe device's queue pairs, while permitting user mode access to certain I/O-path queue pairs. These embodiments include a kernel mode NVMe driver and an application programming interface (API) library for use by a user mode application. The kernel mode driver creates and manages regular queue pairs and reserved queue pairs. The regular queue pairs exist within kernel space memory and are used for conventional I/O APIs (e.g., by a kernel mode filesystem driver). On the other hand, the reserved queue pairs are exposed to user space memory and are used for user mode I/O. This arrangement enables user mode applications to get direct data access to an NVMe device (e.g., via the reserved queue pairs), which reduces latency and provides for higher I/O operations per second (e.g., through reduced context switches to kernel mode) without dedicating the NVMe device exclusively to user mode access. This means that conventional file APIs and filesystems managed by the OS kernel also work.

In embodiments, a host cache improves the performance of storage I/O operations of VMs and/or containers to their virtual disks by utilizing NVMe protocols. For example, some embodiments use a virtual (e.g., emulated) NVMe controller to expose virtual disks to VMs and/or containers, enabling those VMs/containers to utilize NVMe queues, buffers, control registers, etc., directly. Additionally, or alternatively, a host cache improves the performance of storage I/O operations of VMs and/or containers to their virtual disks by leveraging PMem as high-performance non-volatile storage for caching reads and/or writes.

In these embodiments, a host caching service environment integrates the foregoing embodiments for providing user mode direct access to NVMe device I/O-path queue pairs that are managed by an OS kernel. For example, a host caching service, a virtual NVMe controller, etc., gain access to NVMe device I/O-path queue pairs, which reduces latency and provides for higher I/O operations per second for a host caching service. However, these embodiments are applicable beyond a host caching service.

FIG. 1 illustrates an example of a host cache service operating within a cloud environment 100. In FIG. 1, cloud environment 100 includes hosts (e.g., host 101*a*, host 101*b*; collectively, hosts 101). An ellipsis to the right of host 101*b* indicates that hosts 101 can include any number of hosts (e.g., one or more hosts). In embodiments, each host is a VM host and/or a container host. Cloud environment 100 also includes storage 118 (e.g., one or more storage devices) storing, e.g., virtual disks 115 (e.g., virtual disk 116*a*, virtual disk 116*b*) for use by VMs/containers operating at hosts 101, de-staged cache data (e.g., cache store 117), etc.

In the example of FIG. 1, each host of hosts 101 includes a corresponding host OS including a corresponding host kernel (e.g., host kernel 108*a*, host kernel 108*b*) that each includes (or interoperates with) a containerization component (e.g., containerization component 113*a*, containerization component 113*b*) that supports the creation of one or more VMs and/or one or more containers at the host. Examples of containerization components include a hypervisor (or elements of a hypervisor stack) and a containerization engine (e.g., AZURE container services, DOCKER, LINUX Containers). In FIG. 1, each host of hosts 101 includes a VM (e.g., VM 102*a*, VM 102*b*). VM 102*a* and VM 102*b* are each shown as including a guest kernel (e.g., guest kernel 104*a*, guest kernel 104*b*) and user software (e.g., user software 103*a*, user software 103*b*).

In FIG. 1, each host includes a host cache service (e.g., cache service 109*a*, cache service 109*b*). In embodiments, a storage driver (e.g., storage driver 105*a*, storage driver 105*b*) at each VM/container interacts, via one or more I/O channels (e.g., I/O channels 106*a*, I/O channels 106*b*) with a virtual storage controller (e.g., virtual storage controller 107*a*, virtual storage controller 107*b*) for its I/O operations, such as I/O operations for accessing virtual disks 115. In embodiments, each host cache service communicates with a virtual storage controller to cache these I/O operations. As one example, in FIG. 1, the virtual storage controllers are shown as being virtual NVMe controllers. In this example, the I/O channels comprise NVMe queues (e.g., administrative queues, submission queues, completion queues), buffers, control registers, and the like.

In embodiments, each host cache service at least temporarily caches reads (e.g., read cache 110*a*, read cache 110*b*) and/or writes (e.g., write cache 112*a*, write cache 112*b*) in memory (e.g., RAM 111*a*, RAM 111*b*). As shown, in some embodiments, memory includes non-volatile PMem. For example, a read cache stores data that has been read (and/or that is predicted to be read) by VMs from storage 118 (e.g., virtual disks 115), which can improve read I/O performance for those VMs (e.g., by serving reads from the read cache if that data is read more than once). A write cache, on the other hand, stores data that has been written by VMs to virtual disks 115 prior to persisting that data to storage 118. Write caching allows for faster write operations, as the data can be written to the write cache quickly and then be written to storage 118 at a later time, such as when storage 118 is less busy.

In embodiments, and as indicated by arrows 114*a* and 114*b*, each host cache service may persist (e.g., de-stage) cached writes from memory to storage 118 (e.g., to virtual disks 115 and/or to cache store 117). In addition, an arrow that connects write cache 112*a* and write cache 112*b* indicates that, in some embodiments, the host cache service replicates cached writes from one host to another (e.g., from host 101*a* to host 101*b*, or vice versa).

Figure 2:
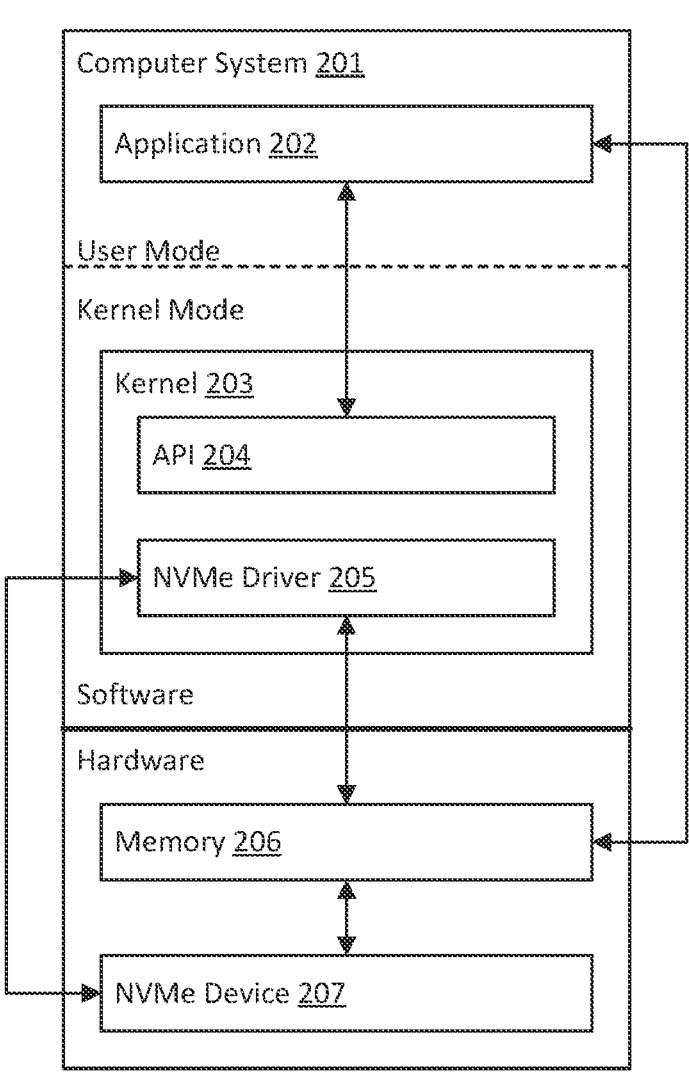
FIG. 2 illustrates an example of a computer system that provides user mode components with direct access to Non-Volatile Memory Express (NVMe) device input/output-path queue pairs.

As mentioned, some embodiments provide user mode components with direct access to NVMe device I/O-path queue pairs (e.g., SQ/CQ parings) that are managed by an OS kernel, thereby providing for secure kernel mode management of an NVMe device's queue pairs, while permitting user mode access to certain I/O-path queue pairs via user space memory. FIG. 2 illustrates an example 200 of a computer system 201, such as host 101*a*, host 101*b*, etc. In example 200, computer system 201 includes hardware such as a processor system (not shown), a memory 206, and an NVMe device 207. Computer system 201 also executes software, such as kernel 203 (e.g., as part of an OS) and application 202. As shown, kernel 203 executes in a kernel mode context, while application 202 executes in a user mode context. Referring to FIG. 1 and host 101*a*, in an example, kernel 203 corresponds to host kernel 108*a*, and application 202 corresponds to virtual storage controller 107*a*, cache service 109*a*, or VM 102*a* (or even combinations thereof). In example 200, kernel 203 includes an NVMe driver 205, which interacts with NVMe device 207 directly (e.g., to set doorbell registers) or via memory 206 (e.g., memory corresponding to queue pairs). Thus, kernel 203 has direct access to NVMe device 207 as is conventional for NVMe drivers.

As shown in example 200, application 202 interacts with NVMe driver 205 via an API 204 provided by kernel 203. In embodiments, application 202 interacts with an NVMe driver 205 using API 204 to set up NVMe queue pairs within memory 206 accessible by application 202 (e.g., user space memory). In some embodiments, application 202 interacts with an NVMe driver 205 using API 204 to modify doorbell registers at NVMe device 207. Thus, concurrent with direct access to NVMe device 207 by kernel 203, application 202 also has access to NVMe device 207 (e.g., via memory 206, via API 204). Example 200, therefore, illustrates an environment that provides application 202 in user mode direct access to NVMe device I/O-path queue pairs (e.g., SQs and CQs) that are managed by kernel 203, thereby providing for secure kernel mode management of queue pairs for NVMe device 207, while permitting user mode access to certain I/O-path queue pairs.

Figure 3A:
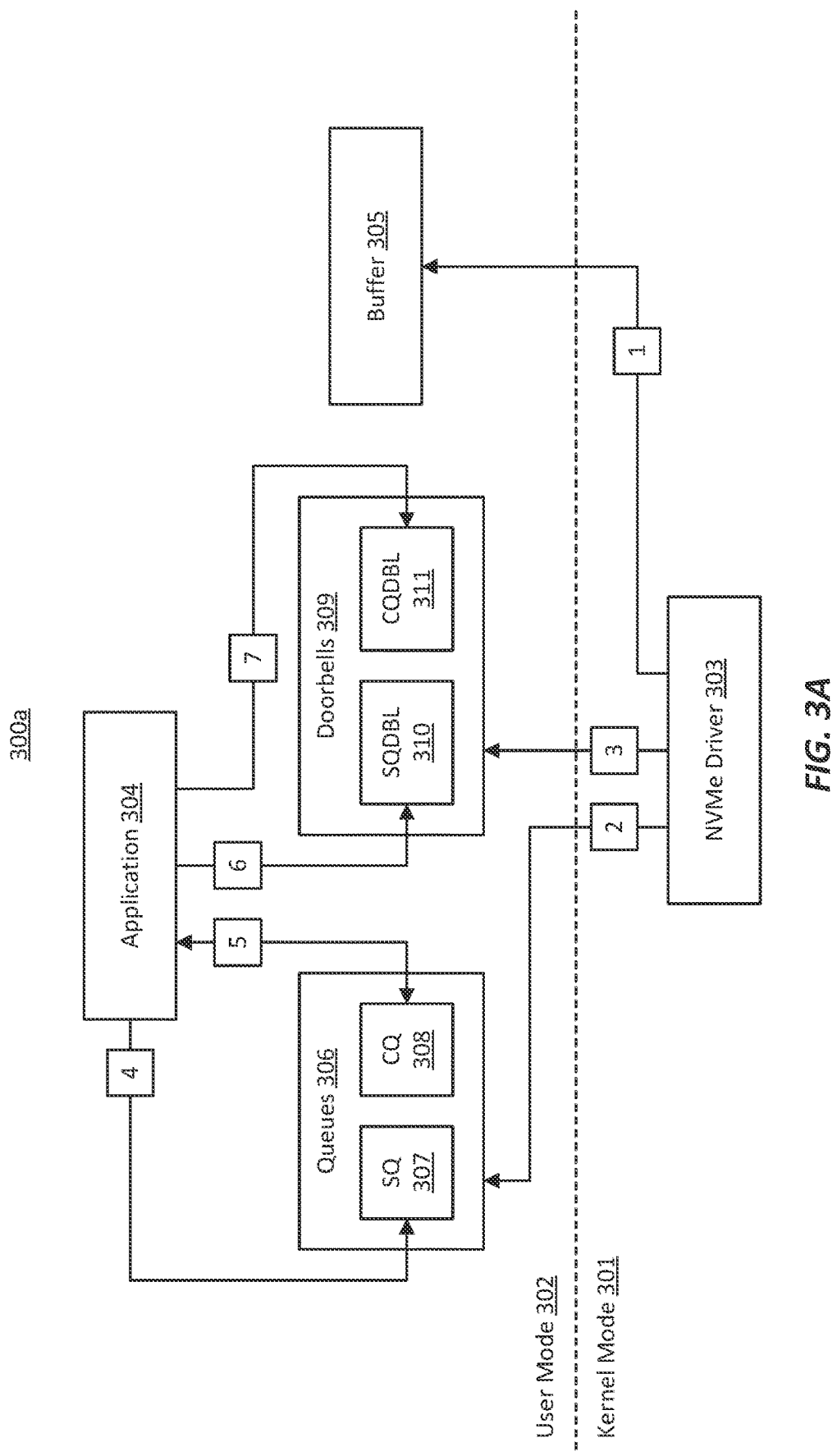
FIGS. 3A-3B illustrate examples of a kernel mode NVMe driver sharing NVMe device access with a user mode application.
Figure 3B:
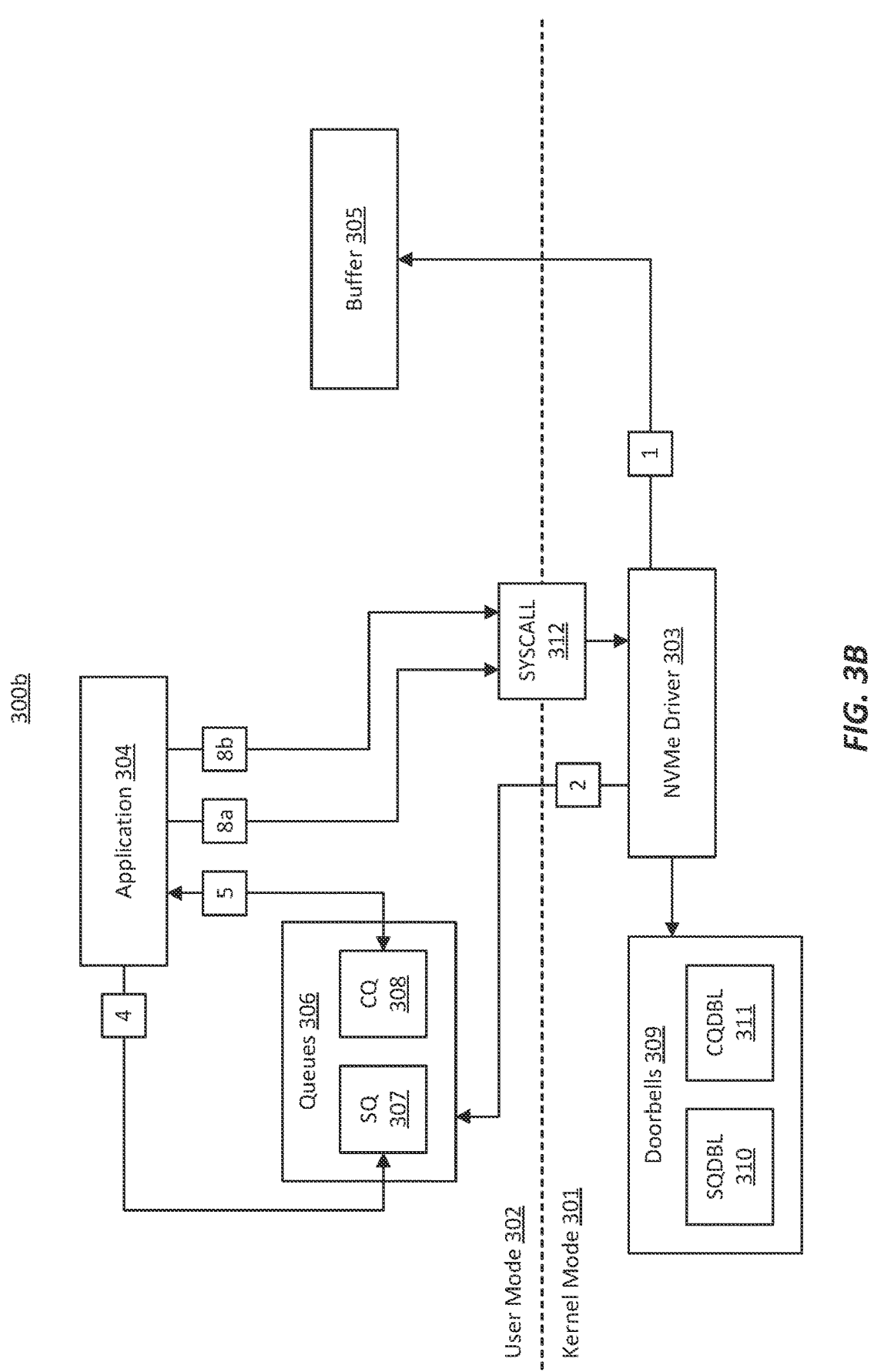

FIGS. 3A and 3B illustrate example 300*a* and example 300*b* of a kernel mode NVMe driver sharing NVMe device access with a user mode application. In each of example 300*a* and example 300*b*, an NVMe driver 303 (e.g., NVMe driver 205) executes in kernel mode 301 in a computer system, and an application 304 (e.g., application 202) executes in user mode 302 in the computer system. Using an API (e.g., API 204), application 304 negotiates NVMe resources—such as a memory buffer, one or more queue pairs, and/or doorbells—that the NVMe driver 303 makes accessible to user mode 302.

In reference to example 300*a* and example 300*b*, an arrow labeled 1 indicates that application 304 obtains (e.g., via a system call into NVMe driver 303) a user mode mapping to a memory buffer 305 that application 304 uses to communicate data with an NVMe device (e.g., via DMA). For example, application 304 obtains, via a system call into NVMe driver 303, a user mode memory address that NVMe driver 303 has mapped to memory buffer 305, a size of memory buffer 305, and the like. An arrow labeled 2 indicates that application 304 also obtains (e.g., via a system call into NVMe driver 303) user mode mappings to a reserved queue pair (e.g., SQ 307 and CQ 308 in queues 306) for communicating commands directly to the NVMe device. For example, application 304 obtains, via a system call into NVMe driver 303, a user mode memory address that NVMe driver 303 has mapped to SQ 307, a user mode memory address that NVMe driver 303 has mapped to SQ 308, a size of each queue, and the like.

In reference to example 300*a*, an arrow labeled 3 indicates that, in one embodiment, application 304 also obtains (e.g., a system call into NVMe driver 303) user mode mappings (e.g., memory addresses) to NVMe hardware doorbell registers-illustrated as SQ doorbell (SQDBL 310) and CQ doorbell (CQDBL 311) in doorbells 309—that enable application 304 to ring doorbells at the NVMe device directly. Alternatively, in reference to example 300*b*, in another embodiment, NVMe driver 303 exposes an API that includes a system call (SYSCALL 312), through which application 304 requests that NVMe driver 303 interact with doorbells 309 on its behalf. Notably, the embodiment of example 300*a* has the benefit of achieving lower I/O latency than the embodiment of example 300*b*, e.g., because application 304 can ring doorbells 309 without any transitions between kernel mode 301 and user mode 302. However, example 300*a* may sacrifice some control by NVMe driver 303 because application 304 is enabled to directly modify the state of the NVMe device (e.g., hardware doorbell register values). In contrast, the embodiment of example 300*b* has the benefit of maintaining control of the NVMe device by NVMe driver 303, which may improve security and/or stability, with the drawback of requiring any kernel transition between kernel mode 301 and user mode 302 for application 304 to ring a doorbell at the NVMe device.

In reference to example 300*a* and example 300*b*, an arrow labeled 4 indicates that application 304 submits an I/O command via direct access to SQ 307. After submitting the I/O command, application 304 rings SQDBL 310 directly (e.g., an arrow labeled 6, example 300*a*), or uses SYSCALL 312 to request that NVMe driver 303 ring SQDBL 310 (e.g., an arrow labeled 8*a*, example 300*b*). In embodiments, after ringing SQDBL 310, application 304 continues executing while waiting for the I/O command to complete. An arrow labeled 5 indicates that, during this execution, application 304 occasionally polls CQ 308 to determine when the submitted command has been completed. Depending on the command being sent to SQ 307, application 304 may use memory buffer 305 to send data to the NVMe device or read data from the NVMe device.

After identifying a CQ entry, application 304 may ring CQDBL 311 directly (e.g., an arrow labeled 7, example 300*a*) or use SYSCALL 312 to request that NVMe driver 303 ring CQDBL 311 (e.g., an arrow labeled 8*b*, example 300*b*). In some embodiments, SYSCALL 312 rings both SQDBL 310 and CQDBL 311 in a single call (e.g., the arrow labeled 8*a*), reducing the number of system calls needed in the embodiment of example 300*b*.

In some embodiments, NVMe driver 303 partitions an NVMe device between multiple user mode components (e.g., multiple applications, multiple VMs, and/or multiple containers) by allocating a unique set of logical block addresses (LBAs) to each user mode component. In embodiments, as part of processing SYSCALL 312 to ring a doorbell, NVMe driver 303 validates that the user mode component is performing legal operations before ringing a hardware doorbell (e.g., by verifying the items in the SQ, such as to ensure that a given user mode component only interacts with its allocated set of LBAs, to ensure that a given user mode component is interacting with an LBA that is present in the underlying storage, and the like).

Figure 4:
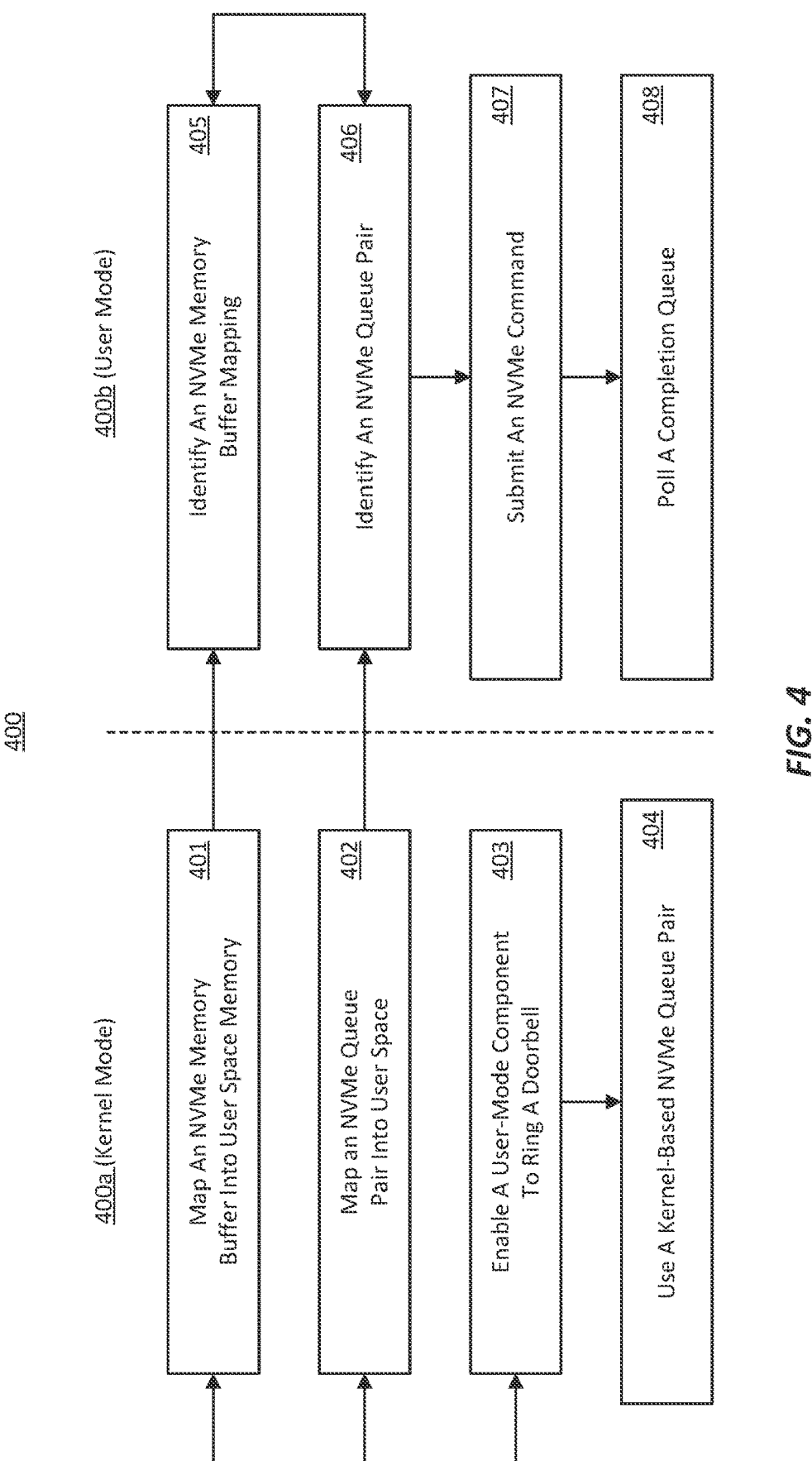
FIG. 4 illustrates a flow chart of an example of a method in which a kernel mode NVMe driver shares NVMe device access with a user mode application.

Embodiments are now described in connection with FIG. 4, which illustrates a flow chart of an example method 400 in which a kernel mode NVMe driver shares NVMe device access with a user mode application. In embodiments, instructions for implementing method 400 are encoded as computer-executable instructions (e.g., NVMe driver 303, application 304) stored on a computer storage media that are executable by a processor to cause a computer system (e.g., computer system 201) to perform method 400. As shown in FIG. 4, in embodiments, method 400 includes method 400*a* performed in kernel mode (e.g., by NVMe driver 303) and method 400*b* performed in user mode (e.g., by application 304).

The following discussion now refers to a number of methods and method acts. Although the method acts are discussed in specific orders or are illustrated in a flow chart as occurring in a particular order, no order is required unless expressly stated or required because an act is dependent on another act being completed prior to the act being performed.

Referring initially to method 400*a* (kernel mode), in embodiments, method 400*a* comprises act 401, at a kernel mode driver, of mapping an NVMe memory buffer into user space memory. In some embodiments, act 401 comprises mapping a memory buffer into a user mode address space, the memory buffer enabling data transfer with an NVMe device via DMA. For instance, referring to example 300*a* and example 300*b*, in one embodiment NVMe driver 303 maps memory buffer 305 into user mode 302 memory (e.g., a user mode address space), making memory buffer 305 accessible to application 304. In an alternate embodiment, application 304 registers memory buffer 305 with NVMe driver 303. In some embodiments, NVMe driver 303 performs act 401 based on a request from application 304 such that mapping of the memory buffer into the user mode address space is based on receiving a system call from the user mode component.

Method 400*a* also comprises act 402, at the kernel mode driver, of mapping an NVMe queue pair into user space memory. In some embodiments, act 402 comprises mapping a first NVMe queue pair, which comprises a first SQ and a first CQ, into the user mode address space, the first NVMe queue pair enabling a user mode component to submit a command to the NVMe device. For instance, referring to example 300*a* and example 300*b*, in one embodiment, NVMe driver 303 maps queues 306 into user mode 302 memory, making them accessible to application 304. In this embodiment, mapping the first NVMe queue pair into the user mode address space comprises mapping a first user mode memory address to the first SQ and mapping a second user mode memory address to the first CQ. In an alternate embodiment, application 304 registers queues 306 with NVMe driver 303 In this embodiment, mapping the first NVMe queue pair into the user mode address space comprises registering a first user mode memory address to the first SQ with an NVMe driver, and registering a second user mode memory address to the first CQ with the NVMe driver.

In some embodiments, NVMe driver 303 performs act 401 based on a request from application 304 such that mapping of the first NVMe queue pair into the user mode address space is based on receiving a system call from the user mode component.

Method 400*a* also comprises act 403, at a kernel mode driver, of enabling a user mode component to ring a doorbell. In some embodiments, act 403 comprises enabling the user mode component to ring a doorbell at the NVMe device. In one example, and referring to example 300*a*, NVMe driver 303 maps doorbells 309 into user mode 302 memory, making them accessible to application 304 directly. In another example, and referring to example 300*b*, NVMe driver 303 exposes SYSCALL 312 to user mode 302, enabling application 304 to request the NVMe driver 303 interact with doorbells 309.

In some embodiments (e.g., example 300*a*), enabling the user mode component to ring the doorbell at the NVMe device includes mapping an NVMe doorbell register into the user mode address space.

In other embodiments (e.g., example 300*b*), enabling the user mode component to ring the doorbell at the NVMe device includes exposing a system call (e.g., SYSCALL 312) to the user mode component through which the user mode component rings the doorbell. In these embodiments, method 400*a* may include, based on receiving the system call from the user mode component, writing a value to an NVMe CQ doorbell and/or writing a value to an NVMe SQ doorbell.

In embodiments, NVMe driver 303 performs act 403 based on a request from application 304, such that enabling the user mode component to ring the doorbell at the NVMe device is based on receiving a system call from the user mode component.

Notably, in FIG. 4, there is no particular ordering required between act 401 to act 403. Thus, in various embodiments, these acts may be performed serially (in any order) and/or in parallel. In performing act 401 to act 403, NVMe driver 303 has enabled application 304 to interact with an NVMe device.

Method 400a also comprises act 404, at the kernel mode driver, of using a kernel-based NVMe queue pair. In some embodiments, act 404 comprises processing an NVMe command in the kernel mode using a second NVMe queue pair, which comprises a second SQ and a second CQ. For example, NVMe driver 303 uses a separate queue pair within kernel mode 301 to interact with the NVMe device. Thus, NVMe driver 303 and application 304 have concurrent access to the NVMe device.

As mentioned, in some embodiments, NVMe driver 303 validates that the user mode component is performing legal operations before ringing a hardware doorbell (e.g., by verifying the items in the SQ, such as to ensure that a given user mode component only interacts with its allocated set of LBAs). Thus, in some embodiments, method 400a includes validating that the user mode component is accessing a valid range of logical block addresses at the NVMe device based on receiving the system call from the user mode component.

Referring now to method 400b (user mode), in embodiments, method 400b comprises act 405, at a user mode component, of identifying an NVMe memory buffer mapping (e.g., based on act 401 of method 400a). In some embodiments, act 405 comprises identifying a mapping of a memory buffer into the user mode address space, the memory buffer enabling data transfer with the NVMe device via DMA. For instance, referring to example 300a and example 300b, application 304 identifies memory buffer 305 (e.g., based on information passed from NVMe driver 303 to application 304 via a system call). In some embodiments, application 304 requests the memory buffer mapping from NVMe driver 303, such that method 400b further includes making a system call to the kernel mode NVMe driver, which results in the mapping of the memory buffer into the user mode address space.

Method 400b also comprises act 406, at the user mode component, of identifying an NVMe queue pair (e.g., based on act 402 of method 400a). In some embodiments, act 406 comprises identifying a mapping of an NVMe queue pair, which comprises an SQ and a CQ, into a user mode address space, the NVMe queue pair having been mapped into the user mode address space by a kernel mode NVMe driver. For instance, referring to example 300a and example 300b, application 304 identifies queues 306 (e.g., based on information passed from NVMe driver 303 to application 304 via a system call). In some embodiments, application 304 requests the NVMe queue pair mapping from NVMe driver 303, such that method 400b further includes making a system call to the kernel mode NVMe driver, which results in the mapping of the NVMe queue pair into the user mode address space.

Although not expressly illustrated, in some embodiments, method 400b enables application 304 to access NVMe device doorbells. As discussed in connection with act 403, this could be because NVMe driver 303 has mapped doorbells 309 into user mode 302 memory or because NVMe driver 303 has exposed SYSCALL 312 to user mode 302.

Notably, in FIG. 4, there is no particular ordering required between acts 405 and 406. Thus, in various embodiments, these acts may be performed serially (in any order) or in parallel.

Method 400b also comprises act 407, at the user mode component, of submitting an NVMe command. In embodiments, act 407 comprises submitting an NVMe command to an NVMe device, including writing an SQ entry to the SQ of the NVMe queue pair and ringing an SQ doorbell register. For instance, referring to example 300a and example 300b, application 304 adds an entry to SQ 307 and rings a doorbell, either directly by writing to SQDBL 310 or indirectly by calling SYSCALL 312.

In some embodiments, ringing the SQ doorbell register includes writing a value to the SQ doorbell register, which is mapped into the user mode address space. In other embodiments, ringing the SQ doorbell register includes calling a system call exposed by the kernel mode NVMe driver. In embodiments, calling the system call exposed by the kernel mode NVMe driver results in the kernel mode NVMe driver ringing both of the SQ doorbell register and a CQ doorbell register.

In some embodiments, based on submitting the NVMe command to the NVMe device in act 407, the user mode component reads data from the memory buffer, the data having originated from the NVMe device based on the NVMe command. In other embodiments, based on submitting the NVMe command to the NVMe device in act 407, the user mode component writes data to the memory buffer, the data having been written to the NVMe device based on the NVMe command.

Method 400b also comprises act 408, at the user mode component, of polling a completion queue. In some embodiments, act 408 comprises polling the CQ of the NVMe queue pair and, based on the polling, identifying a CQ entry. Referring to example 300a and example 300b, application 304 polls CQ 308 and locates a CQ entry signaling completion, by the NVMe device, of the command submitted in act 407.

Embodiments of the disclosure comprise or utilize a special-purpose or general-purpose computer system (e.g., host 101a, host 101b, computer system 201) that includes computer hardware, such as, for example, a processor system and system memory (e.g., RAM 111a, RAM 111b, memory 206), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media. Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phasechange memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more CPUs, one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (Saas), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more VMs. During operation, VMs emulate an operational computing system, supporting an OS and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only illustrative and not restrictive. All changes that come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented by a Non-Volatile Memory Express (NVMe) driver operating in a kernel mode, in a computer system that includes a processor system, comprising:

mapping a memory buffer into a user mode address space, the memory buffer enabling data transfer with an NVMe device via direct memory access (DMA);

mapping a first NVMe queue pair, which comprises a first submission queue (SQ) and a first completion queue (CQ), into the user mode address space, the first NVMe queue pair enabling a user mode component to submit a command to the NVMe device;

enabling the user mode component to ring a doorbell at the NVMe device, including exposing a system call to the user mode component; and based on receiving the system call from the user mode component, validating that the user mode component is accessing a valid range of logical block addresses at the NVMe device; and processing an NVMe command in the kernel mode using a second NVMe queue pair, which comprises a second SQ and a second CQ.

2. The method of claim 1, wherein the system call is a first system call, and wherein mapping of the memory buffer into the user mode address space is based on receiving a second system call from the user mode component.

3. The method of claim 1, wherein the system call is a first system call, and wherein mapping of the first NVMe queue pair into the user mode address space is based on receiving a second system call from the user mode component.

4. The method of claim 1, wherein the system call is a first system call, and wherein enabling of the user mode component to ring the doorbell at the NVMe device is based on receiving a second system call from the user mode component.

5. The method of claim 1, wherein the method further comprises, based on receiving the system call from the user mode component, writing a value to an NVMe CQ doorbell.

6. The method of claim 1, wherein the method further comprises, based on receiving the system call from the user mode component, writing a value to an NVMe SQ doorbell.

7. The method of claim 1, wherein mapping the first NVMe queue pair into the user mode address space comprises at least one of, mapping a first user mode memory address to the first SQ and mapping a second user mode memory address to the first CQ; or registering a third user mode memory address to the first SQ with an NVMe driver, and registering a fourth user mode memory address to the first CQ with the NVMe driver.

8. A method, implemented by a user mode component, in a computer system that includes a processor system, comprising:

identifying a mapping of a Non-Volatile Memory Express (NVMe) queue pair, into a user mode address space, the NVMe queue pair comprising a submission queue (SQ) and a completion queue (CQ), and the NVMe queue pair having been mapped into the user mode address space by a kernel mode NVMe driver;

submitting an NVMe command to an NVMe device, including, writing an SQ entry to the SQ of the NVMe queue pair; and ringing an SQ doorbell register via a system call to the kernel mode NVMe driver, wherein, based on receiving the system call from the user mode component, the kernel mode NVMe driver validates that the user mode component is accessing a valid range of logical block addresses at the NVMe device; and polling the CQ of the NVMe queue pair and, based on the polling, identifying a CQ entry.

9. The method of claim 8, wherein the method further comprises identifying a mapping of a memory buffer into the user mode address space, the memory buffer enabling data transfer with the NVMe device via direct memory access (DMA).

10. The method of claim 9, wherein the method further comprises, based on submitting the NVMe command to the NVMe device, reading first data from the memory buffer, wherein the first data originates from the NVMe device based on the NVMe command; or writing second data to the memory buffer, wherein the second data is written to the NVMe device based on the NVMe command.

11. The method of claim 8, wherein calling the system call exposed by the kernel mode NVMe driver results in the kernel mode NVMe driver ringing both of the SQ doorbell register and a CQ doorbell register.

12. The method of claim 8, wherein the system call is a first system call, and wherein the method further comprises making a second system call to the kernel mode NVMe driver, which results in the mapping of the NVMe queue pair into the user mode address space.

13. A computer system, comprising:

a processor system; and a computer storage medium that stores computer-executable instructions that are executable by the processor system to at least:

within a kernel mode context in the computer system:

map a memory buffer into a user mode address space, the memory buffer enabling data transfer with a Non-Volatile Memory Express (NVMe) device via direct memory access (DMA);

map a first NVMe queue pair, which comprises a first submission queue (SQ) and a first completion queue (CQ), into the user mode address space, the first NVMe queue pair enabling a user mode component to submit a command to the NVMe device;

enable the user mode component to ring a doorbell at the NVMe device, including exposing a system call to the user mode component; and based on receiving the system call from the user mode component, validate that the user mode component is accessing a valid range of logical block addresses at the NVMe device; and process a first NVMe command using a second NVMe queue pair, which comprises a second SQ and a second CQ; and within a user mode context in the computer system:

identify the first NVMe queue pair;

submit a second NVMe command to the NVMe device, including, writing an SQ entry to the first SQ; and ringing an SQ doorbell register via the system call; and poll the first CQ, and, based on the polling, identify a CQ entry.

14. The computer system of claim 13, wherein the computer-executable instructions are also executable by the processor system to at least, within the user mode context in the computer system, identify a mapping of the memory buffer into the user mode address space.

15. The computer system of claim 13, wherein the system call is a first system call, and wherein mapping of the memory buffer into the user mode address space is based on receiving a second system call from the user mode component.

16. The computer system of claim 13, wherein the system call is a first system call, and wherein mapping of the first NVMe queue pair into the user mode address space is based on receiving a second system call from the user mode component.

17. The computer system of claim 13, wherein the system call is a first system call, and wherein enabling of the user mode component to ring the doorbell at the NVMe device is based on receiving a second system call from the user mode component.

18. The computer system of claim 13, wherein the computer-executable instructions are also executable by the processor system to write a value to an NVMe CQ doorbell based on receiving the system call from the user mode component.

19. The computer system of claim 13, wherein the computer-executable instructions are also executable by the processor system to write a value to an NVMe SQ doorbell based on receiving the system call from the user mode component.

20. The computer system of claim 13, wherein mapping the first NVMe queue pair into the user mode address space comprises at least one of, mapping a first user mode memory address to the first SQ and mapping a second user mode memory address to the first CQ; or registering a third user mode memory address to the first SQ with an NVMe driver, and registering a fourth user mode memory address to the first CQ with the NVMe driver.

* * * * *